United States Patent
Durocher et al.

(10) Patent No.: US 8,182,204 B2
(45) Date of Patent: May 22, 2012

(54) DEFLECTOR FOR A GAS TURBINE STRUT AND VANE ASSEMBLY

(75) Inventors: Eric Durocher, Vercheres (CA);
Mohamad Sleiman, Saint-Laurent (CA);
Panagiota Tsifourdaris, Montreal (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 523 days.

(21) Appl. No.: 12/429,242

(22) Filed: Apr. 24, 2009

(65) Prior Publication Data
US 2010/0272566 A1    Oct. 28, 2010

(51) Int. Cl.
F01D 5/14 (2006.01)
F03D 11/00 (2006.01)
F04D 29/38 (2006.01)

(52) U.S. Cl. ............... 415/115; 415/208.2; 415/229; 60/796; 60/798

(58) Field of Classification Search ............ 415/115, 415/200, 209.1, 142, 208.2; 60/796, 798
See application file for complete search history.

(56) References Cited

U.S. PATENT DOCUMENTS

| | | |
|---|---|---|
| 3,039,736 A | 6/1962 | Pon |
| 3,578,264 A | 5/1971 | Kuethe |
| 3,844,115 A | 10/1974 | Fried |
| 4,420,288 A | 12/1983 | Bischoff |
| 4,465,433 A | 8/1984 | Bischoff |
| 4,558,564 A | 12/1985 | Bouiller et al. |
| 4,720,239 A | 1/1988 | Owczarek |
| 4,965,994 A | 10/1990 | Ciokajlo et al. |
| 5,058,837 A | 10/1991 | Wheeler |
| 5,160,251 A | 11/1992 | Ciokajlo |
| 5,307,622 A | 5/1994 | Ciokajlo et al. |
| 5,361,580 A | 11/1994 | Ciokajlo et al. |
| 5,372,006 A * | 12/1994 | Lair .............. 60/226.2 |
| 5,443,229 A | 8/1995 | O'Brien et al. |
| 5,634,767 A | 6/1997 | Dawson |
| 5,813,214 A | 9/1998 | Moniz et al. |
| 6,185,925 B1 | 2/2001 | Proctor et al. |
| 6,213,711 B1 | 4/2001 | Muller et al. |
| 6,283,705 B1 | 9/2001 | Rice et al. |
| 6,484,971 B2 | 11/2002 | Layukallo |
| 6,708,482 B2 | 3/2004 | Seda |
| 6,851,264 B2 | 2/2005 | Kirtley et al. |
| 6,883,303 B1 | 4/2005 | Seda |
| 7,137,245 B2 | 11/2006 | Graziosi et al. |
| 7,189,055 B2 | 3/2007 | Marini et al. |
| 7,244,104 B2 | 7/2007 | Girgis et al. |
| 7,762,086 B2 * | 7/2010 | Schwark ............ 60/796 |
| 2007/0231134 A1 | 10/2007 | Kumar et al. |
| 2007/0237635 A1 | 10/2007 | Nagendra et al. |
| 2007/0261411 A1 | 11/2007 | Nagendra et al. |
| 2008/0022692 A1 | 1/2008 | Nagendra et al. |
| 2008/0031727 A1 * | 2/2008 | Sjoqvist ............ 415/142 |

* cited by examiner

*Primary Examiner* — David Nhu
(74) *Attorney, Agent, or Firm* — Norton Rose Canada LLP

(57) ABSTRACT

A gas turbine engine is provided having an annular duct having an inner duct wall and an outer duct wall. At least one strut extends between the inner duct wall and the outer duct wall. The strut has an aerodynamic shape. At least one vane located circumferentially adjacent the strut and axially behind a leading edge of the strut, and an aerodynamic deflector located circumferentially between each strut and each vane. The aerodynamic deflector may positioned axially upstream of a flow separation point which would otherwise be caused by the strut.

19 Claims, 5 Drawing Sheets

DEFLECTOR FOR A GAS TURBINE STRUT AND VANE ASSEMBLY

TECHNICAL FIELD

The application relates generally to gas turbine engines, and more particularly, to a deflector for a strut and vane assembly.

BACKGROUND OF THE ART

Gas turbine engine ducts may have structural struts in the gas path flow, as well as stationary airfoil vanes which guide combustion gases through the duct. The structural struts are typically larger in cross-section than the vanes, and the struts may tend to cause flow separation, particularly when in close proximity to the vanes, which is undesirable. Conventionally, this problem is addressed by axially spacing the struts apart from the vanes to avoid flow separation, which can result in a longer engine configuration.

Accordingly, there is a need to provide improvements to the conventional strut and vane architecture.

SUMMARY

In one aspect, there is provided a gas turbine engine comprising an annular gas path duct having an inner duct wall and an outer duct wall, the gas path duct having: a plurality of struts extending radially between the inner duct wall and the outer duct wall, the struts having an aerodynamic shape; a plurality of airfoil vanes located circumferentially around the duct, the vanes extending radially between the inner duct wall and the outer duct wall, the vanes having leading edges disposed downstream of leading edges of the struts relative to a direction of gas flow through the engine; a plurality of aerodynamic deflectors extending radially between the inner duct wall and the outer duct wall, the deflectors located circumferentially around the duct, a said aerodynamic deflector being circumferentially located between a said strut and an adjacent said vane; and wherein the leading edges of the struts define a first radially extending plane and the leading edges of the vanes define a second radially extending plane, and wherein leading edges of the aerodynamic deflectors are axially positioned between said first and second planes.

In another aspect, there is provided a vane assembly providing a section of an annular duct of a gas turbine engine for directing a fluid flow therethrough, the assembly comprising inner and outer duct walls, a plurality of strut fairings, aerodynamic vanes and aerodynamic deflectors each extending radially between the inner and outer duct walls, each of the strut fairings having a circumferential width dimension greater than a circumferential width dimension of the respective vanes, leading edges of the deflectors positioned upstream of leading edges of the vanes and downstream of leading edge of the strut fairings with respect to the fluid flow through the duct, a said deflector being positioned circumferentially between at least one said strut fairing and an adjacent vane.

In a further aspect, there is provided a method of channelling an axial gas flow between a strut and adjacent vane of a circumferential array of vanes in a gas turbine engine, the strut having a leading edge upstream of leading edges of the vanes with respect to the axial flow, the method comprising: (a) determining an axial location at which a flow separation substantially caused by the strut would occur; and (b) providing at least one deflector having an aerodynamic profile, positioned circumferentially between the strut and the adjacent one of the vanes, the deflector having a leading edge upstream of the axial point and a trailing edge downstream of the axial point, the deflector thereby extending axially through the axial location, such that in use the axial gas flow through the engine passing the struts will be guided by the deflectors so as to substantially impede flow separation around the strut.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

Figure 1:
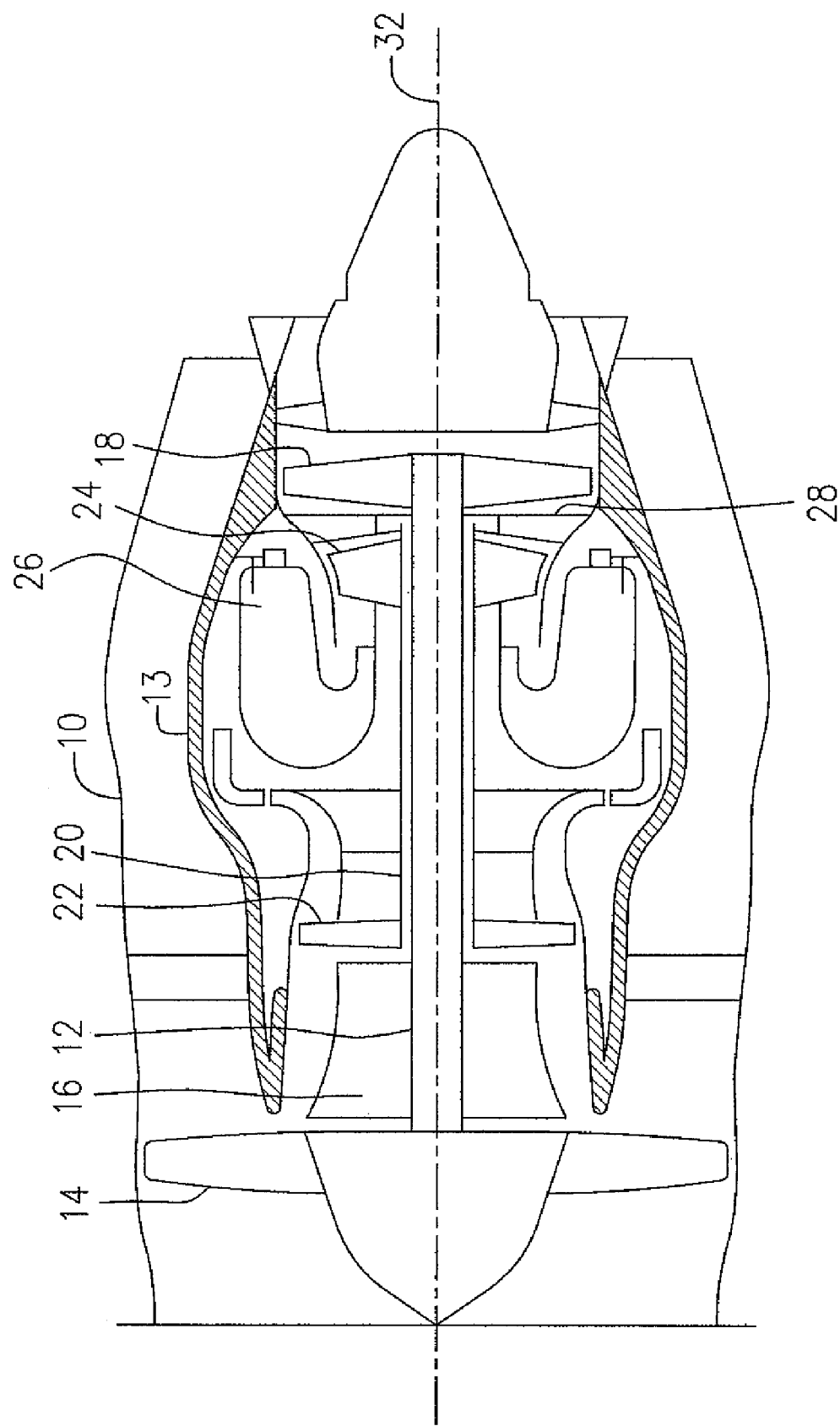
FIG. 1 is a schematic cross-sectional view of a bypass gas turbine engine as an exemplary application of the described subject matter.

Referring to FIG. 1, a bypass gas turbine engine has an engine axis 32 and includes a housing or nacelle 10, a casing 13, a low pressure spool assembly which includes a fan assembly 14, a low pressure compressor assembly 16 and a low pressure turbine assembly 18 connected by a shaft 12, and a high pressure spool assembly which includes a high pressure compressor assembly 22 and a high pressure turbine assembly 24 connected by a turbine shaft 20. The core casing 13 surrounds the low and high pressure spool assemblies to define a main fluid path there through. In the main fluid path there is provided a combustor 26 to generate combustion gases to power the high pressure turbine assembly 24 and the low pressure turbine assembly 18. A mid turbine frame system 28 is disposed between the high pressure turbine assembly 24 and the low pressure turbine assembly 18.

Figure 2:
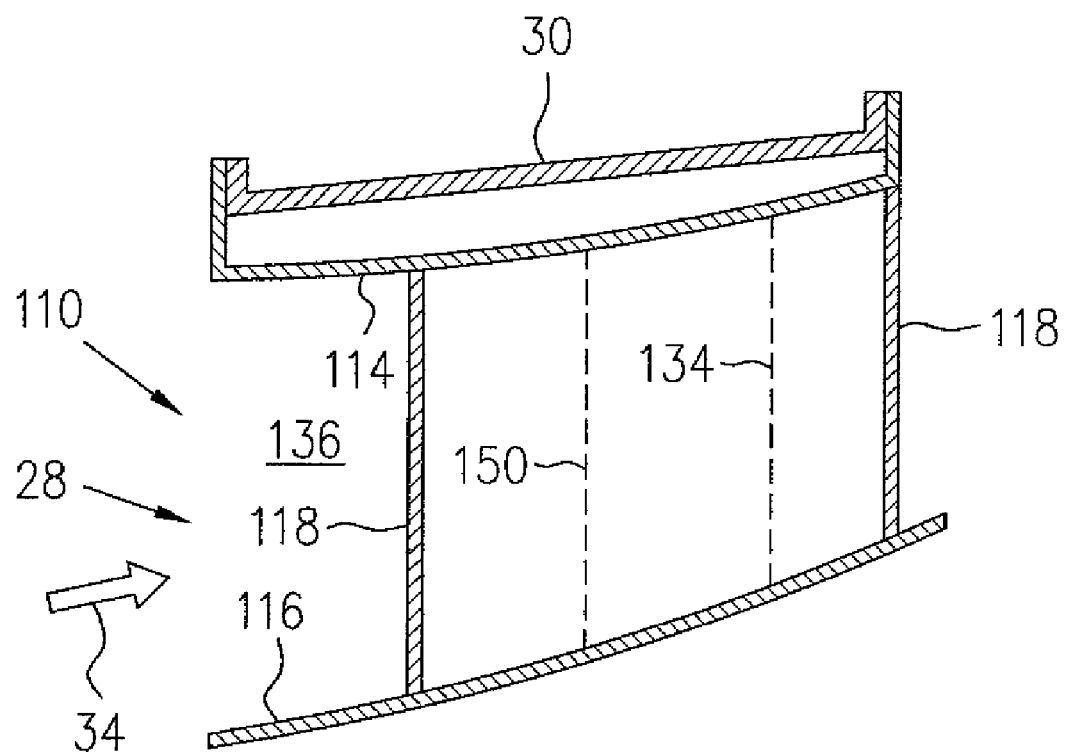
FIG. 2 is a partial cross-sectional view of a strut and vane ring assembly having aerodynamic deflectors according to one embodiment of the described subject matter.
Figure 3:
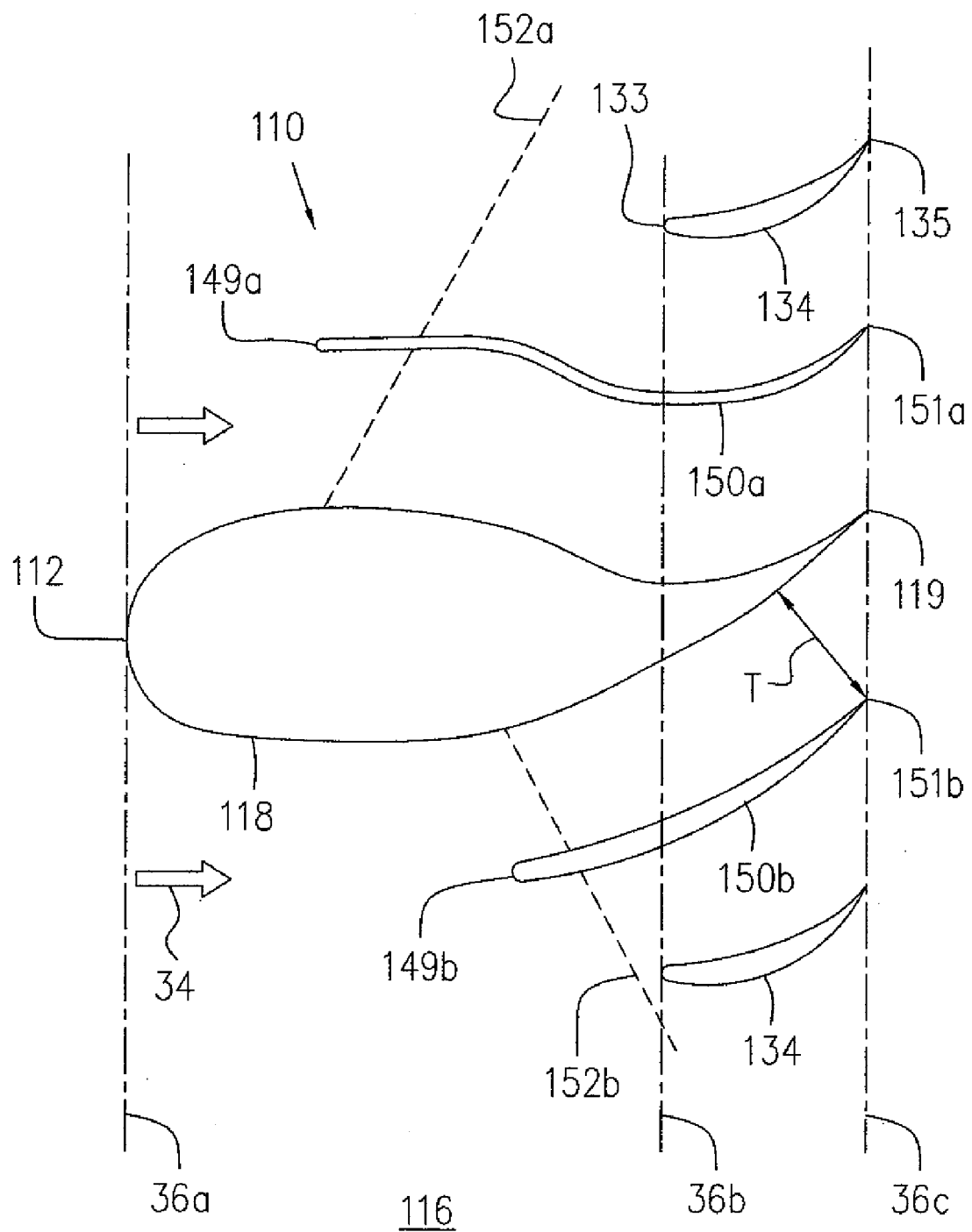
FIG. 3 is a circumferentially extended schematic partial view of a strut vane, and aerodynamic deflector structure of the strut and vane ring assembly of FIG. 2.

Referring to FIGS. 1-3, the mid turbine frame (MTF) system 28 includes an annular outer case 30 (see FIG. 2) which has mounting flanges (not numbered) at both ends for connection to the core casing 13 of the engine. The outer case 30 may be a part of the core casing 13. The MTF system 28 includes a strut and vane ring assembly 110 which is supported within the annular outer case 30, for directing a gas flow 34 from the high pressure turbine assembly 24 therethrough to the low pressure turbine assembly 18.

The strut and vane ring assembly 110 includes annular outer and inner duct walls 114 and 116 defining a gas path duct 136 for directing the gas flow 34. A plurality of circumferentially spaced structural struts (only one shown) 118 extend radially between the outer and inner duct walls 114, 116. The structural struts 118 have an aerodynamic shape in cross-section forming a fairing with leading edges 112 and trailing edges 119 relative to the gas flow 34 direction. A plurality of airfoil vanes 134 are located circumferentially around and axially at a rear end of the gas path duct 136 and extend radially between the outer and inner duct walls 114, 116. The airfoil vanes 134 have leading edges 133 and trailing edges 135 relative to the gas flow 34 direction. The leading edges 133 of the airfoil vanes 134 are disposed downstream of leading edges 112 of the structural struts 118 relative to a direction of the gas flow 34. The structural struts 118 each have a circumferential dimension much greater than the circumferential dimension of the airfoil vanes 134, for example, at least double the thickness. The airfoil vanes 134 generally form vane nozzles (not numbered) for directing the gas flow 34 when the gas flow 34 exits the gas path duct 136. The structural struts 118 substantially transfer loads and may have a hollow structure to allow support components and oil service lines to pass therethrough.

According to this embodiment, a plurality of aerodynamic deflectors 150 extend radially between the outer and inner duct walls 114, 116 and are located around the gas path duct 136. For example, deflectors 150 may include first and second groups of deflectors 150a and 150b, (only one of each group is shown in FIG. 3). Deflectors 150a and 150b have leading edges 149a and 149b respectively, and trailing edges 151a and 151b respectively, relative to the gas flow 34. Each deflector 150a and 150b is located circumferential between an adjacent strut 118 and an adjacent vane 134. Deflector 150a is positioned at the pressure side of the strut 118 and deflector 150b is positioned at the suction side the strut 118. It should be noted that airfoil vanes 134 are used to form an array of vane nozzles (not numbered) for directing the gas flow 34 when exiting the gas path duct 136. The presence of the deflectors 150a, 150b reduces pressure variation at an exit of the annular gas path duct 136, thereby improving the dynamics of blades located downstream of the strut and vane ring assembly 110, for example, the rotor of the low pressure turbine assembly 18.

For convenience of description of this embodiment, lines 36a, 36b and 36c are shown in FIG. 3. Line 36a represents a radially extending plane defined by the leading edges 112 of the struts 118. Line 36b represents a radially extending plane defined by the leading edges 133 of the vanes 134. Line 36c represents a radially extending plane defined by the trailing edges 135, 151a and 151b of the respective vanes 134 and deflectors such as 150a, 150b. Each of the struts 118 is incorporated with one of the vanes 134 and thus the trailing edges 119 of the struts are also on the plane represented by line 36c, The leading edges 149a and 149b of the respective deflectors 150a and 150b, are axially positioned between lines 36a and 36b. The deflectors 150a and 150b are thereby used to intercept flow separation which may be substantially caused by the strut 118.

In particular, lines 152a and 152b represent two series of axial points along the circumferential direction at the respective pressure and suction sides of the strut 118, at which flow separation substantially caused by the strut 118, would occur if deflectors 150a and 150b were not in place. The deflectors 150a and 150b may extend across the respective lines 152a and 152b thereby more effectively intercepting a flow stream of the flow separation at the axial points represented by lines 152a and 152b. Optionally, deflector 150a which is positioned at the pressure side of the strut 118, extends further upstream relative to the gas flow 34 direction, than the deflector 150b which is positioned at the suction side of the strut 118, because the flow separation substantially caused by the strut 118 at the pressure side thereof would occur in a more upstream location than the flow separation at the suction side of the strut 118, as shown by the lines 152a and 152b.

Optionally, the deflectors 150a and 150b are positioned substantially circumferentially midway between the adjacent struts 118 and the airfoil vane 134. The trailing edges 119, 135 and 151a, 151b of the respective struts 118, vanes 134 and deflectors 150a and 150b have a substantially same shape, thereby defining substantially equal throat areas of the vane nozzles formed by the strut and vane ring assembly 110. A throat area of the vane nozzles is a smallest annulus area between two adjacent airfoils as shown in FIG. 3 and indicated by letter "T". The throat areas in combination form a metering exit area of the strut and vane ring assembly 110 for the gas flow 34, and control the engine rotor speed by increasing or reducing this metering exit area.

Figure 4:
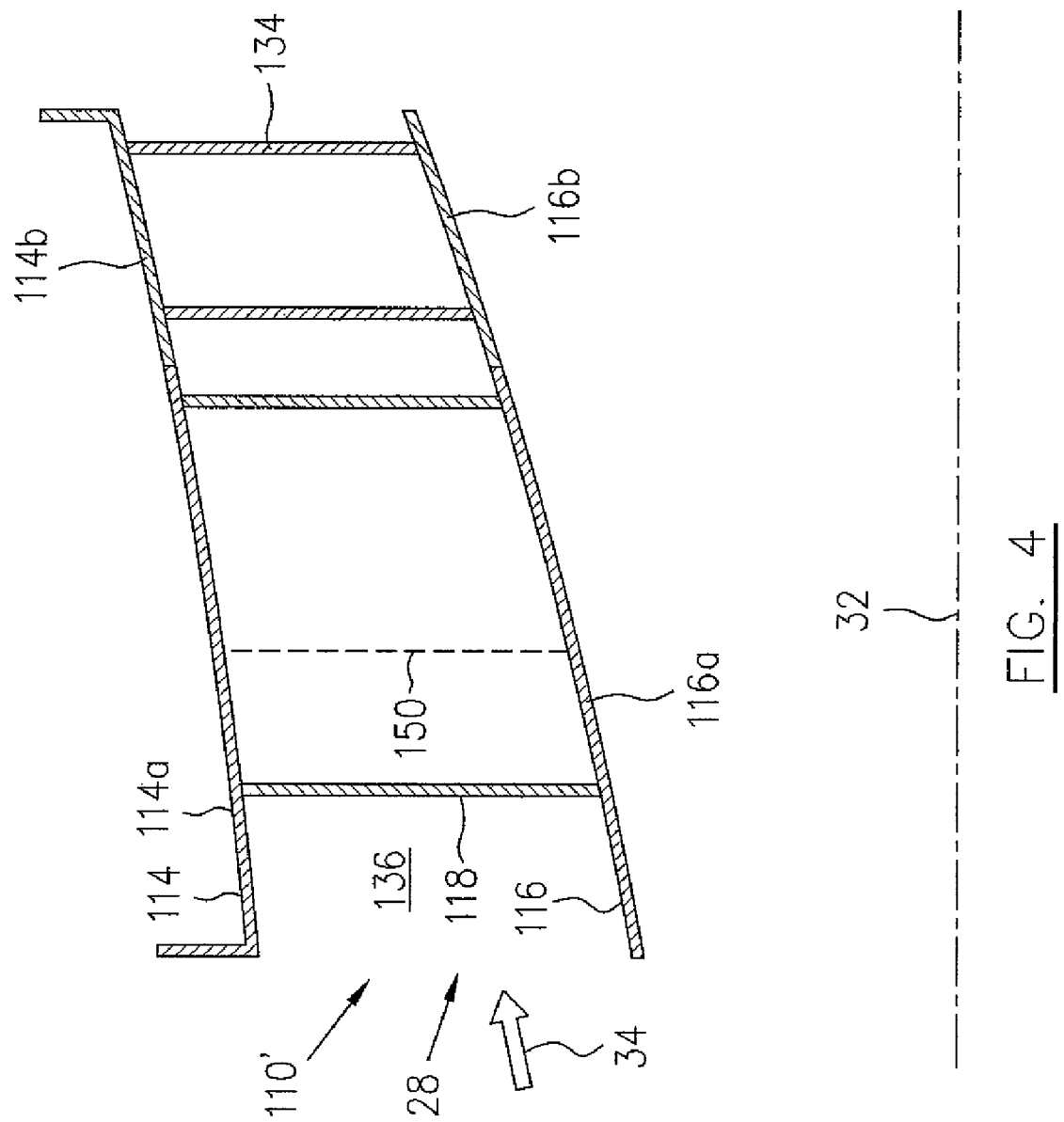
FIG. 4 is a partial cross-sectional view of a strut and vane ring assembly having deflectors according to another embodiment.
Figure 5:
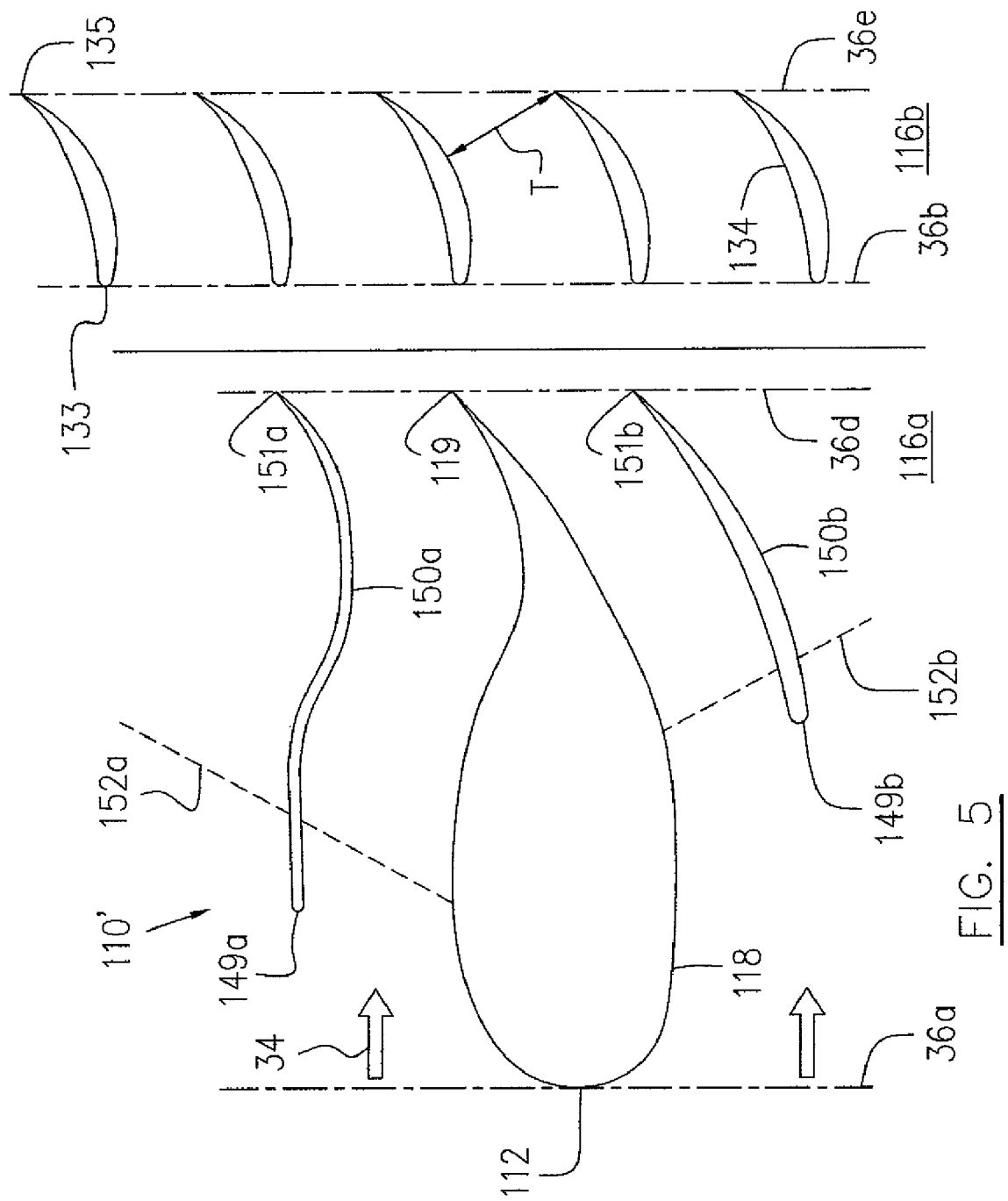
FIG. 5 is a circumferentially extended schematic partial view of the strut and vane ring assembly of FIG. 4

Referring to FIG. 1 and FIGS. 4-5, the MTF system 28 of the gas turbine engine includes a strut and vane ring assembly 110' which is formed with a separate strut ring (not numbered) and vane ring (not numbered) according to another embodiment, in contrast to the strut and vane ring assembly 110 of FIGS. 2 and 3 in which structural struts 118 are incorporated into the vane ring. Components and features of the strut and vane ring assembly 110' of FIGS. 4 and 5 which are similar to those of the strut and vane ring assembly 110 of FIGS. 2 and 3 are indicated by similar numerals and will not be redundantly described herein. The following description of strut and vane ring assembly 110' will be focussed on the structures thereof which are different from the strut and vane ring assembly 110 of FIGS. 2 and 3.

The strut and vane ring assembly 110' includes outer and inner duct walls 114, 116 to define the gas path duct 136 therebetween, and may be supported within the outer casing 30 of FIG. 2 (not shown in this embodiment). The outer and inner duct walls 114, 116 include respective front sections 114a, 116a to form the strut ring, and rear sections 114b and 116b to form the vane ring. Struts 118 radially extend between the front section 114a, 116a of the respective outer and inner duct walls 114, 116 and vanes 134 radially extend between the rear sections 114b and 116b of the respective outer and inner duct walls 114, 116. The strut ring and the vane ring are connected together for example, by welding the front section 114a and rear section 114b of the outer duct wall 114 and by welding together front section 116a and rear section 116b of the inner duct wall 116. Struts 118 are not incorporated with any one of the vanes 134 and the deflectors 150 such as 150a, 150b (shown in FIG. 5) radially extend between the front section 114a of the outer duct wall 114 and the front section 116a of the inner duct wall 116 and do not axially extend into the vane ring defined by the rear section 114b, 116b.

Similar to the strut and vane ring assembly 110 of FIGS. 2 and 3, lines 36a and 36b in FIG. 5 represent radially extending planes defined by the respective leading edges 112 of the struts 118 and leading edges 133 of the vanes 134. However, different from lines 36c of FIG. 3, line 36d of FIG. 5 represents a radially extending plane defined by the trailing edges 119 of the struts 118 and the trailing edges 151a, 151b of the deflectors 150a, 150b and line 36e of FIG. 5 represents a radially extending plane defined by the trailing edges 135 of the vanes 134. As shown in FIG. 5, the leading edges 149a, 149b of the deflectors 150a, 150b are axially positioned between lines 36a and 36b while line 36b is axially positioned downstream of line 36d relative to the direction of the gas flow 34.

The vanes 134 are circumferential evenly spaced one from another in order to define substantially equal throat areas T therebetween for the vane nozzles of the assembly 110'. Optionally, deflectors 150a, 150b may be spaced apart from the respective pressure and suction sides of the strut 118 in order to define throat areas between the strut 118 and the respective deflectors 150a, 150b which are substantially equal to the throat area T of the vanes 134.

Optionally, deflectors 150a and 150b in both embodiments shown in FIGS. 3 and 5 have an aerodynamic profile in a cross-section, substantially contouring the shapes of the respective pressure and suction sides of strut 118.

The above description is meant to be exemplary only, and one skilled in the art will recognize that changes may be made to the embodiments described without departing from the scope of the subject matter disclosed. For example, the described deflectors may be used in any suitable application where it would be beneficial to have deflectors between aerodynamic structures, such as struts and vanes, in order to reduce and/or eliminate flow separation. Still other modifications which fall within the scope of the described subject matter will be apparent to those skilled in the art, in light of a review of this disclosure, and such modifications are intended to fall within the appended claims.

What is claimed is:

1. A gas turbine engine comprising an annular gas path duct having an inner duct wall and an outer duct wall, the gas path duct having:
   a plurality of struts extending radially between the inner duct wall and the outer duct wall, the plurality of struts having an aerodynamic shape;
   a plurality of airfoil vanes located circumferentially around the duct, the airfoil vanes extending radially between the inner duct wall and the outer duct wall, the airfoil vanes having leading edges disposed downstream of leading edges of the plurality of struts relative to a direction of gas flow through the gas turbine engine;
   a plurality of aerodynamic deflectors extending radially between the inner duct wall and the outer duct wall, the plurality of aerodynamic deflectors located circumferentially around the duct, a said aerodynamic deflector being circumferentially located between a said strut and an adjacent said vane; and
   wherein the leading edges of the plurality of struts define a first radially extending plane and the leading edges of the airfoil vanes define a second radially extending plane, and wherein leading edges of the plurality of aerodynamic deflectors are axially positioned between said first and second radially extending planes.

2. The gas turbine engine as defined in claim 1 wherein the leading edge of each said deflector is upstream of an axial point at which a flow separation substantially caused by said adjacent strut occurs when the aerodynamic deflector was not in place.

3. The gas turbine engine as defined in claim 2 wherein trailing edges of the respective struts, deflectors and vanes define a third radially extending plane.

4. The gas turbine engine as defined in claim 2 wherein trailing edges of the respective struts and deflectors define a third plane and wherein the trailing edges of the vanes define a fourth radially extending plane downstream of the third radially extending plane.

5. The gas turbine engine as defined in claim 4 wherein the second radially extending plane is disposed downstream of the third radially extending plane.

6. The gas turbine engine as defined in claim 3 wherein the trailing edges of the plurality of aerodynamic deflectors have a same shape as the trailing edges of the airfoil vanes.

7. The gas turbine engine as defined in claim 3 wherein the gas path duct defines a plurality of substantially equal throat areas between adjacent struts, deflectors and vanes, including strut-to-deflector, deflector-to-vane and vane-to-vane throat areas.

8. The gas turbine engine as defined in claim 1 wherein a said deflector positioned at a pressure side of an adjacent said strut extends further upstream than a said deflector positioned at a suction side of said adjacent strut.

9. The gas turbine engine as defined in claim 3 wherein a said deflector is positioned circumferentially mid way between adjacent a said strut and a said vane.

10. The gas turbine engine as defined in claim 1 wherein each of the struts has at least double the circumferential dimension of one of the respective vanes.

11. A vane assembly providing a section of an annular duct of a gas turbine engine for directing a fluid flow therethrough, the vane assembly comprising inner and outer duct walls, a plurality of strut fairings, aerodynamic vanes and aerodynamic deflectors each extending radially between the inner and outer duct walls, each of the strut fairings having a circumferential width dimension greater than a circumferential width dimension of the respective aerodynamic vanes, leading edges of the aerodynamic deflectors positioned upstream of leading edges of the aerodynamic vanes and downstream of leading edge of the strut fairings with respect to the fluid flow through the duct, a said aerodynamic deflector being positioned circumferentially between at least one said strut fairing and an adjacent aerodynamic vane.

12. The assembly as defined in claim 11 wherein each of the strut fairings is integrated with one of the aerodynamic vanes.

13. The assembly as defined in claim 12 wherein the leading edges of the deflectors are axially aligned with trailing edges of the aerodynamic vanes, thereby forming a plurality of vane nozzles having substantially equal throat areas.

14. The assembly as defined in claim 11 wherein the leading edge of each said deflector is upstream of an axial point at which a flow separation substantially caused by said adjacent strut fairing occurs if the deflector was not in place.

15. The assembly as defined in claim 11 wherein each of the deflectors is circumferentially positioned midway between one of the strut fairings and one of the aerodynamic vanes.

16. The assembly as defined in claim 11 wherein the deflectors comprise a first group of said deflectors, each deflector of said first group of deflectors being positioned at a pressure side of one of said strut fairings and having an aerodynamic profile in a cross-section substantially contoured to correspond with a shape of the pressure side of the strut fairing.

17. The assembly as defined in claim 11 wherein the deflectors comprise a second group of said deflectors, each deflector of said second group of deflectors being positioned at a suction side of one of said strut fairings and having an aerodynamic profile in a cross-section substantially contoured to correspond with a shape of the suction side of the strut fairing.

18. A method of channelling an axial gas flow between a strut and adjacent vane of a circumferential array of vanes in a gas turbine engine, the strut having a leading edge upstream of leading edges of the vanes with respect to the axial gas flow, the method comprising:
   (a) determining an axial location at which a flow separation substantially caused by the strut occurs; and
   (b) providing at least one deflector having an aerodynamic profile, positioned circumferentially between the strut and the adjacent one of the vanes, the deflector having a leading edge upstream of the axial point and a trailing edge downstream of the axial point, the deflector thereby extending axially through the axial location, such that in use the axial gas flow through the gas turbine engine passing the struts will be guided by the deflectors so as to substantially impede flow separation around the strut.

19. A method as defined in claim 18 wherein step (a) is conducted at both pressure and suction sides of the struts and wherein the deflector is positioned in step (b) at each of the pressure and suction sides of the strut.

* * * * *